US007276262B2

(12) United States Patent
Giorgi et al.

(10) Patent No.: US 7,276,262 B2
(45) Date of Patent: Oct. 2, 2007

(54) CONTROL OF PROCESS TIMING DURING MANUFACTURING OF MAGNETIC THIN FILM DISKS

(75) Inventors: Alan P. Giorgi, Cupertino, CA (US);
Paul M. Green, Hollister, CA (US);
Garth W. Helf, San Jose, CA (US);
Eric C. O'Brien, Milpitas, CA (US);
Qin Pan, Cupertino, CA (US);
Anthony L. Smith, San Jose, CA (US);
Robert J. Waltman, Gilroy, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 673 days.

(21) Appl. No.: 10/676,879

(22) Filed: Sep. 30, 2003

(65) Prior Publication Data

US 2005/0069633 A1    Mar. 31, 2005

(51) Int. Cl.
*B05D 1/36* (2006.01)
(52) U.S. Cl. ........................................ 427/8; 427/407.1
(58) Field of Classification Search ................ 427/8, 427/127, 407.1
See application file for complete search history.

(56) References Cited

U.S. PATENT DOCUMENTS

| 4,171,399 | A | 10/1979 | Allen et al. |
| 5,037,710 | A | 8/1991 | Frew et al. |
| 5,143,787 | A | 9/1992 | Frew et al. |
| 5,441,788 | A | 8/1995 | Bloomquist et al. |
| 5,631,041 | A | 5/1997 | Kanaizuka et al. |
| 6,521,286 | B2 | 2/2003 | Isozaki |
| 2001/0021412 | A1 | 9/2001 | Watanabe et al. |
| 2002/0028358 | A1 | 3/2002 | Ishibashi et al. |

FOREIGN PATENT DOCUMENTS

| JP | 55117741 A1 | 9/1980 |
| JP | 56090428 A1 | 7/1981 |
| JP | 61261820 A1 | 11/1986 |
| JP | 62107427 A1 | 5/1987 |
| JP | 02-199627 A1 | 8/1990 |
| JP | 02-214020 A1 | 8/1990 |
| JP | 5073902 A1 | 3/1993 |
| JP | 07-014157 A1 | 1/1995 |
| JP | 11250455 A1 | 9/1999 |
| JP | 12-187835 | 7/2000 |
| JP | 2001283432 A1 | 10/2001 |

*Primary Examiner*—William Phillip Fletcher, III
(74) *Attorney, Agent, or Firm*—G. Marlin Knight

(57) ABSTRACT

A method is presented for controlling process delay times between a) thin film deposition and lubricant application, and b) lubricant application and abrasive polishing. Applicants have discovered that for certain lubricants, a minimum delay time after the overcoat has been deposited before the lubricant is applied increases the number of disks passing the glide test after abrasive polishing. In addition, applicants have discovered that for certain lubricants, the abrasive polishing should take place within a maximum time window following the application of the lubricant. A computerized work-in-progress tracking system is preferably used to implement the method of the invention.

15 Claims, 5 Drawing Sheets

CONTROL OF PROCESS TIMING DURING MANUFACTURING OF MAGNETIC THIN FILM DISKS

FIELD OF THE INVENTION

The invention relates to methods for manufacturing thin film disks for use in magnetic storage devices, and more particularly to lubrication and abrasion surface polishing of thin film disks.

BACKGROUND OF THE INVENTION

In a typical prior art magnetic disk recording system a slider containing magnetic transducers for reading and writing magnetic transitions is urged toward the rotating disk by a suspension. An air-bearing develops under slider and causes it to fly. The term "fly height" and air-bearing height will be used interchangeably herein. Fly heights are shrinking as the demand for increased areal density increases. A slider fly height of less than 10 nm is required for areal densities greater than 60 Gb/in2. To reach the 1 Tb/in$^2$ mark, fly heights in the 2-3 nm range are needed. Fly heights this low place strict requirements on the allowable roughness of the disk surface.

Typically the last thin film layer which is vacuum deposited on the disk is a protective overcoat. Various carbon-based materials are currently in use for the overcoat such as diamond-like carbon, CHx and CNx, but many other materials are being explored. After the thin films have been deposited onto the disk a lubricant is applied to overcoat.

The manufacturing process for disks includes steps at various phases to reduce the roughness. One process commonly used is called "tape polishing." After the lubricant has been applied onto the disk, a tape with an extremely fine abrasive bonded thereto is used to polish the surface of the disk. Although a tape has been traditionally used, various methods of polishing can be employed. The disk's suitability as a flying surface for the slider is typically tested after this abrasive polishing in what is called a "glide test."

The requirements placed on the disk surface are so strict that subtle interactions between the thin films, the lubricant and the abrasive polishing can have a large effect on the yields of the manufacturing process.

SUMMARY OF THE INVENTION

A method is presented for controlling process delay times between a) thin film deposition and lubricant application, and b) lubricant application and abrasive polishing. Applicants have discovered that for certain lubricants, a minimum delay time after the overcoat has been deposited and before the lubricant is applied increases the number of disks passing the glide test after abrasive polishing. In addition, applicants have discovered that for certain lubricants, the abrasive polishing should take place within a maximum time window following the application of the lubricant. A computerized work-in-progress tracking system is preferably used to implement the method of the invention.

DETAILED DESCRIPTION OF THE INVENTION AND THE PREFERRED EMBODIMENTS

The preferred lubricant for use in a system according to the invention is Fomblin Z-TETRAOL which is commercially available from Solvay Solexis, Inc. It is based on a linear perfluoropolyether backbone. The functionalized versions of the "Z," family of lubricants are end capped with two functional groups specifically designed to have a strong interaction with the disk surface. The structure with end caps is given by Solvay Solexis as:

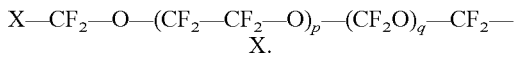

The "X" end groups for Z-TETRAOL are given as:

Figure 1:
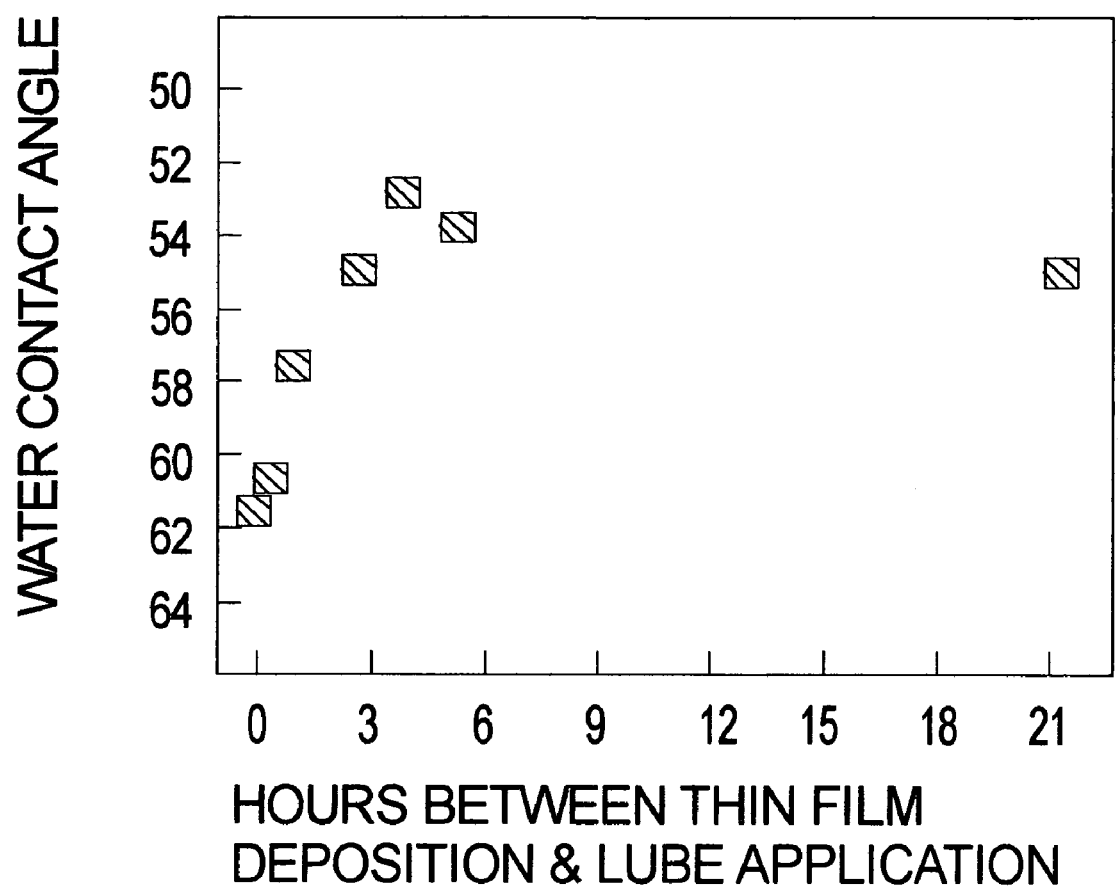
FIG. 1 is a graph of the measured water contact angle of a selected number of disks with a 0 to 21 hour spread in the waiting time between end of thin film deposition and application of the lubricant.

FIG. 1 is a graph of the measured water contact angle a selected number of disks with a 0 to 21 hour spread in the waiting time between the end of thin film deposition (sputtering in this case) and application of the lubricant. The overcoat was CNx on these disks, as well as, those described below. The thickness of the lubricant was approximately 11 angstroms. The water contact angle decreases linearly from about 62 to 53 degrees for corresponding waiting times from 0 to about 3 hours. After 3 hours the water contact angle stabilized and was still 54 degrees for a disk with 21 hours of waiting time.

Figure 2:
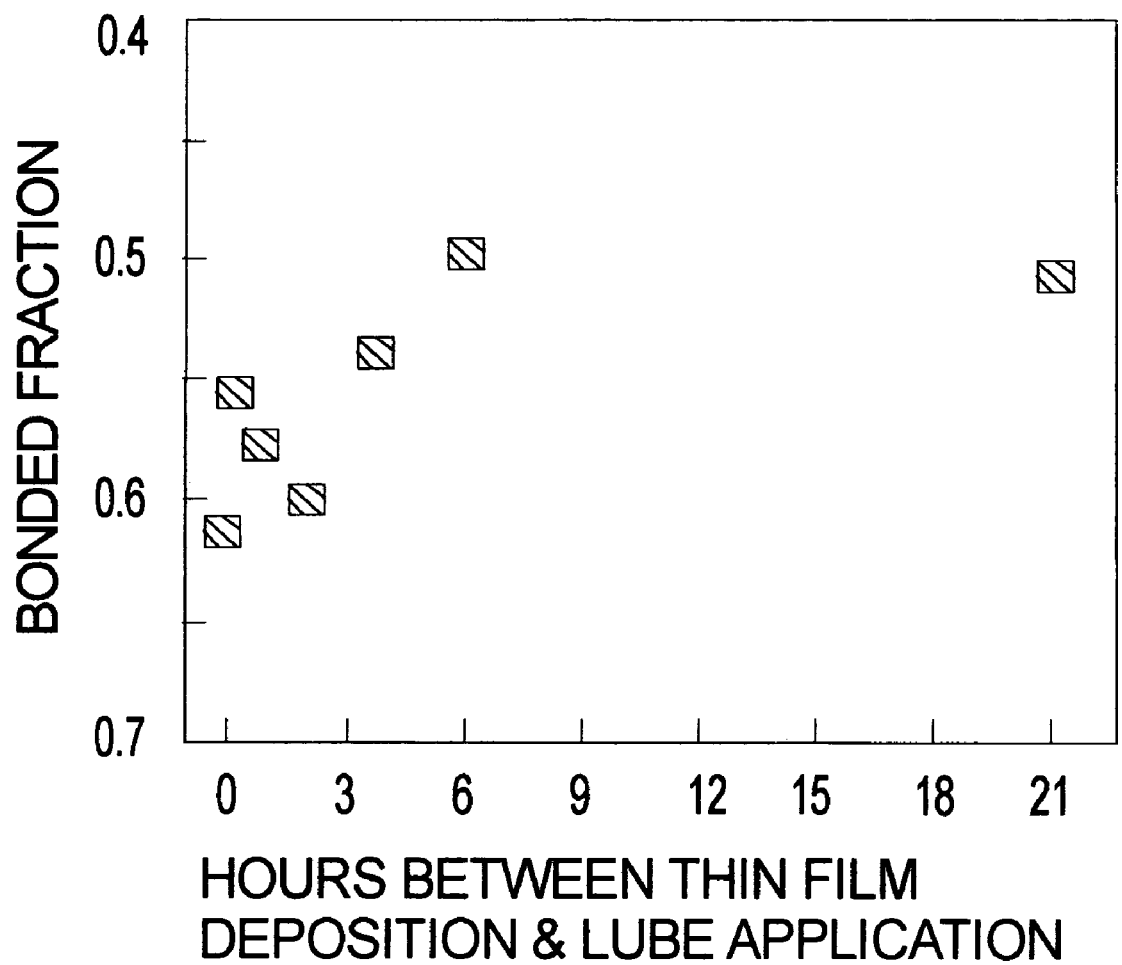
FIG. 2 is a graph of the measured bonded fraction of lubricant for the selected disks presented in FIG. 1.

FIG. 2 is a graph of the measured bonded fraction of lubricant for the selected disks presented in FIG. 1. The bonded fraction decreases linearly, although with more variation than the water contact angle, from about 0.63 to 0.5 degrees for corresponding waiting times from 0 to about 6 hours. After 6 hours the bonded fraction stabilized and was still about 0.5 degrees for the disk with 21 hours of waiting time.

The water contact angle and bonded fraction data show that the overcoat surface is not stable until several hours after the film has been formed and allowed to interact with ambient air. The lubricant is interacting with the overcoat surface differentially based on the waiting time.

Figure 3:
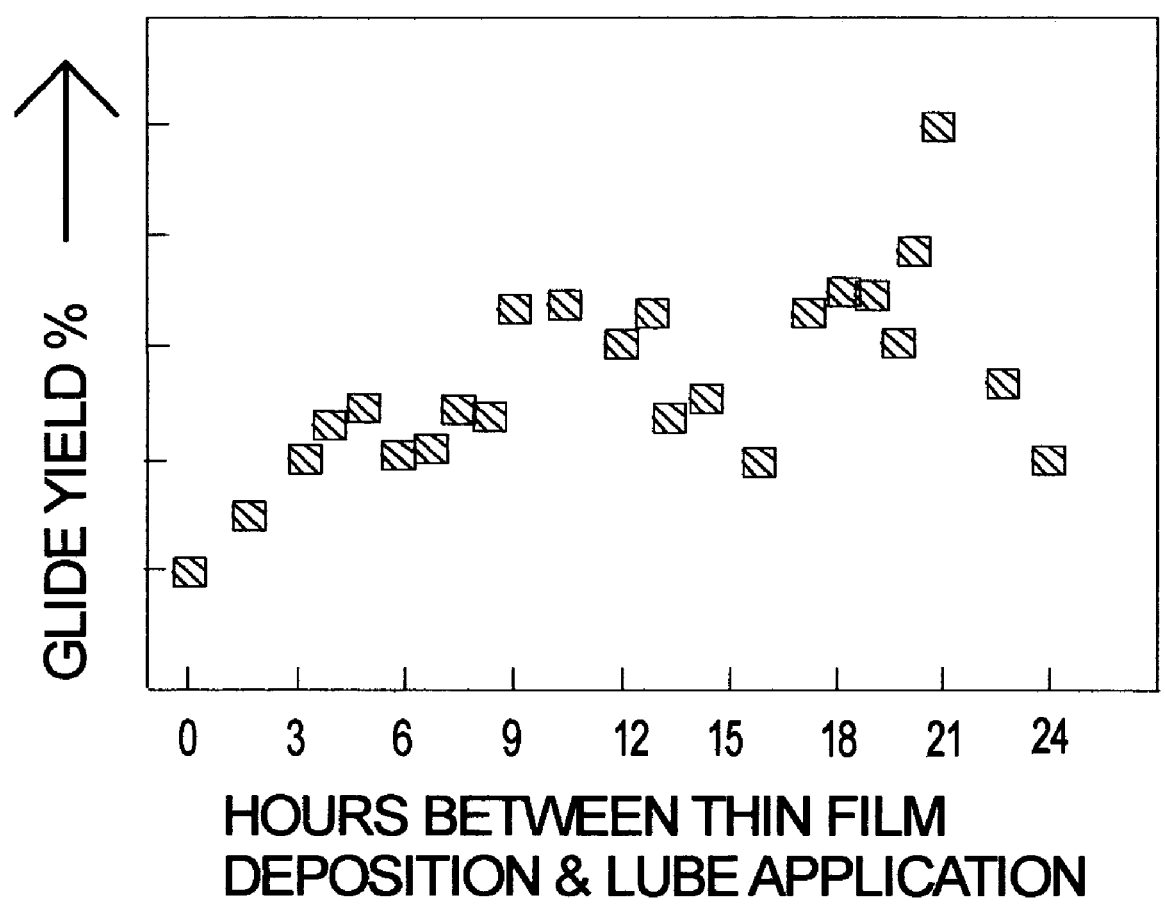
FIG. 3 is a graph of data obtained from thin film disks with a spread of waiting times between the end of thin film deposition (sputtering) and application of the lubricant.

FIG. 3 is a graph of data obtained from thin film disks with a spread of waiting times between the end of thin film deposition and application of the lubricant. The selected time spread is from approximately one hour to twenty-one hours. The vertical axis represents increasing yields from the glide test of two percent per unit. The data clearly show that glide yields were substantially reduced when the waiting time was less than nine hours and even more sharply reduced for a waiting time under 4 hours. The specific time values are not as important as the trend, since the precise times and yields are affected by the particulars of the overcoat composition, the glide test criteria for failure, etc. All of these additional variables were constant while the waiting time was varying, so the trend of the data fairly represents the effect of the waiting time.

The interpretation of the data from FIGS. 1-3 is that the interaction between the lubricant and the overcoat during the period immediately after deposition is deleterious to the glide yield. Correlation of the state of the lubricant to glide yield is related to effect that the lubricant has on the tape polishing. The decrease in the water contact angle and the bonded fraction of the lubricant indicates that the surface energy is decreasing. Conducting the tape polishing with a larger portion of the lubricant unbonded results in less damage to the surface and, therefore, higher yields.

Figure 4:
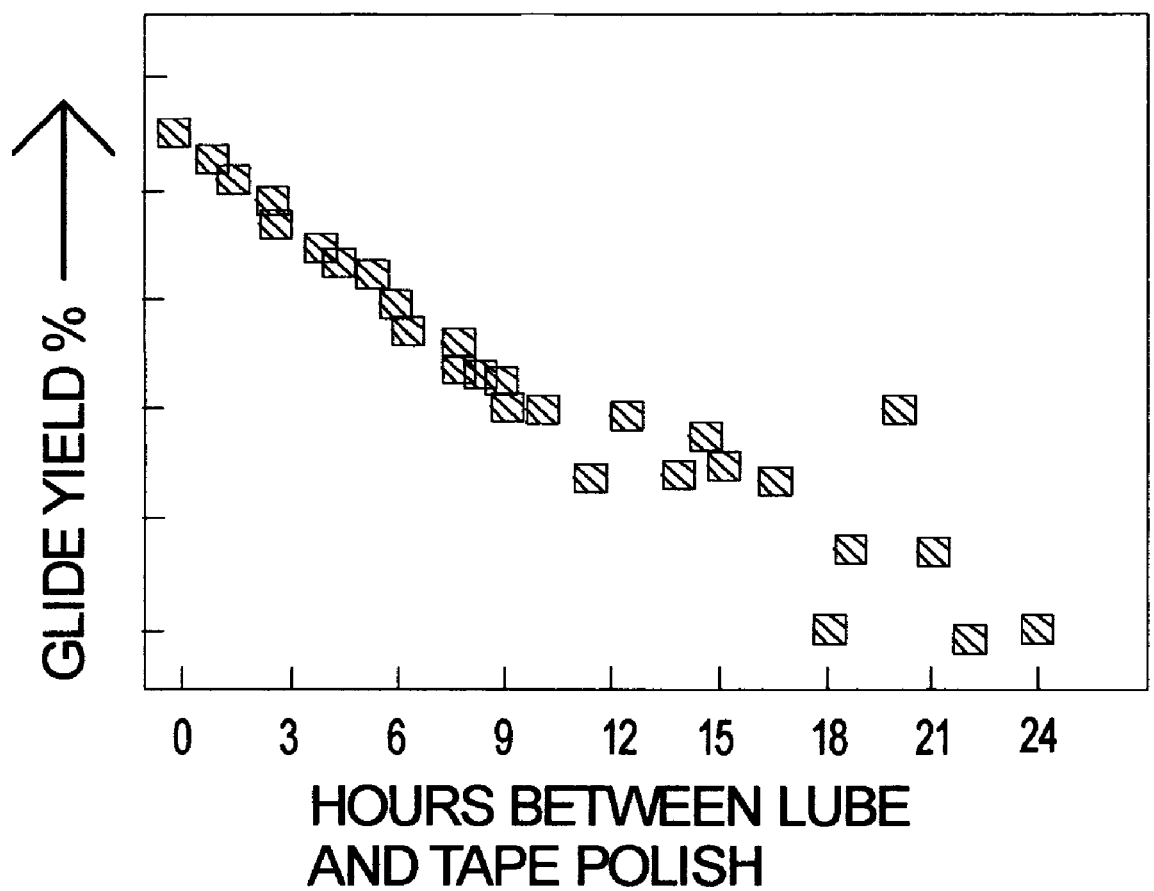
FIG. 4 is a graph of data obtained from thin film disks with a spread of waiting times between the application of the lubricant and tape polishing.

FIG. 4 is a graph of data obtained from thin film disks with a spread of waiting times between the application of the lubricant and tape polishing. The data show a linear decline in yield the longer that the lubricant was on the disk prior to the tape polishing. The linearity is especially pronounced below 10 hours. Thus, the time between lubricant application and tape polishing needs to kept as short as practical.

The method of manufacturing the disks according to the invention preferably includes ensuring that at least several hours have elapsed since the thin film were deposited before applying the lube. The method also preferably includes ensuring that as small a delay as is practical is allowed between applying the lube and tape polishing.

Figure 5:
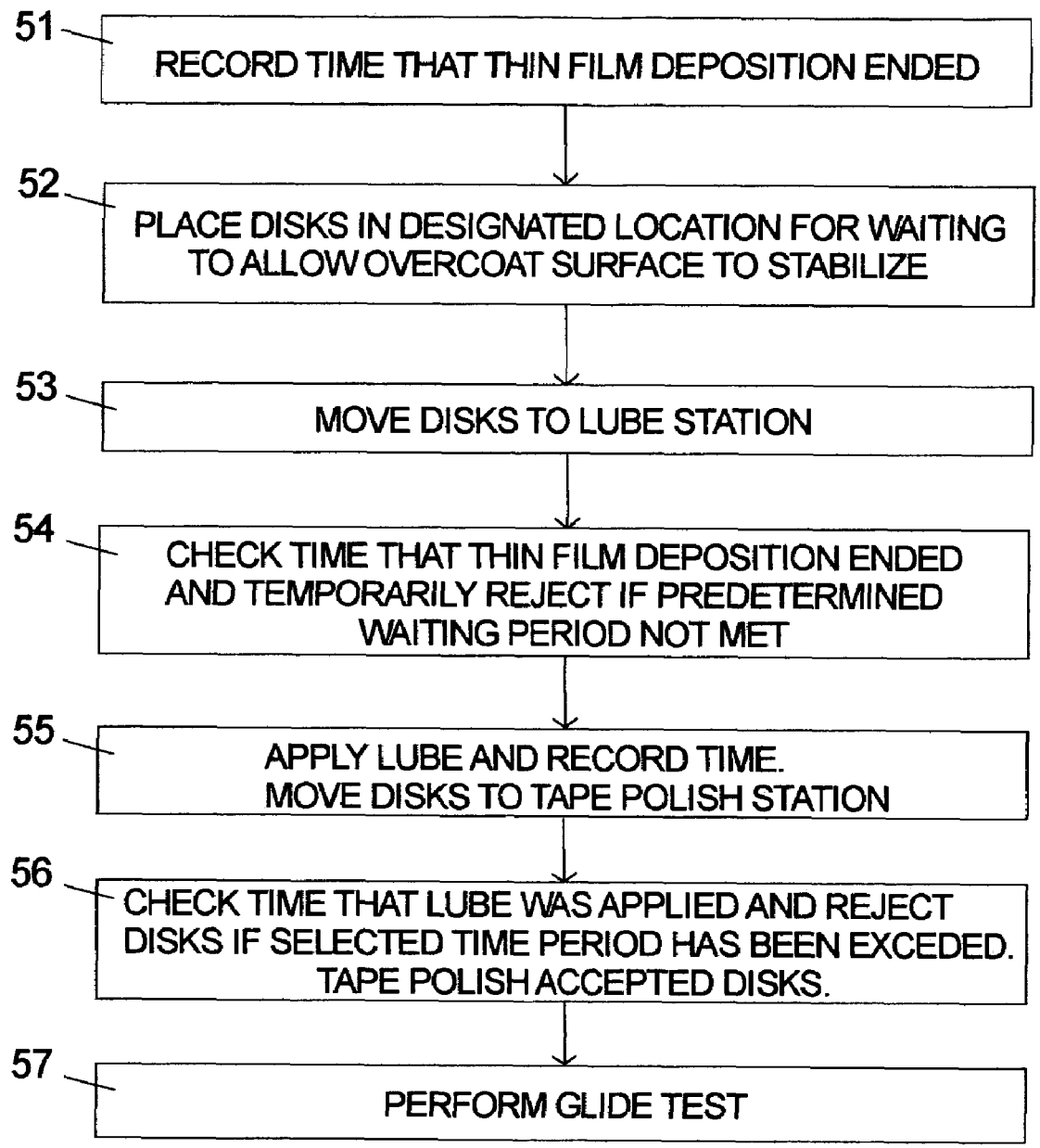
FIG. 5 is a flowchart of a method of manufacturing thin film disks according to the invention

In progress disks are typically placed in carriers with a capacity of tens of disks which are easy for the operators to handle and are also capable of being used in an automated processing station. Since it is impractical to mark the disks with identifying data, the carriers are used to log actions, times, etc. and are usually equipped with a machine readable identifier (e.g. serial number) which can be scanned at each work station and communicated along with operator entered data, etc. into a computer or network used to track the carriers. An embodiment of the method of the invention will be explained with reference to FIG. 5. A preferred embodiment of the method of the invention records a timestamp for the end of thin film deposition for each carrier 51. The in-progress disks can be placed at a designated location with whatever timing aids (timers, flags, alarms, etc.) are available to alert the operators when the carriers are ready to go to the lube station 52. When the disks are moved to the lube station 53, the timestamp for thin film deposition is checked 54 prior to applying the lube to make sure that the predetermined waiting time has occurred. The carrier's identification (ID) is scanned prior to application of the lubricant. The computer will calculate the waiting period and temporarily reject the carrier is the selected time period has not elapsed 54.

When the lubricant is applied, another timestamp will be entered for the carrier 55. The method of the invention includes planning to put the disks into tape polishing as soon as possible. As a safety control, the computer should be programmed to reject the carrier for tape polishing if a predetermined time has been exceeded 56. The glide test follows the tape polishing with no special timing required 57.

The method of the invention has been described with respect to particular embodiments, but other uses and applications for the manufacturing techniques according to the invention will be apparent to those skilled in the art.

The invention claimed is:

1. A method of manufacturing a thin film disk comprising the steps of:

recording a first timestamp for the end of thin film deposition for the disk;

waiting a predetermined time after the first timestamp;

applying a lubricant to the disk after the predetermined time has elapsed, the lubricant having a linear perfluoropolyether backbone;

recording a second timestamp for applying the lubricant to the disk;

checking the second timestamp and rejecting the disk if a selected time period has been exceeded since the lubricant was applied, then performing an abrasive polishing of the disk if the selected time period has not been exceeded since the lubricant was applied; and performing a glide test on the disk.

2. The method of claim 1 wherein the waiting step further comprises placing the disk at a designated location and using a timing aid to alert an operator when the disk is ready for lubrication.

3. The method of claim 1 wherein the linear perfluoropolyether backbone is end capped with functional groups.

4. The method of claim 1 wherein the lubricant has a functional end group comprising $CH_2OCH_2CH(OH)CH_2OH$.

5. The method of claim 1 wherein the linear perfluoropolyether backbone is capped with a functional group comprising $CH_2OCH_2CH(OH)CH_2OH$ at each end.

6. The method of claim 1 wherein the disk has a thin film overcoat of diamond-like carbon.

7. The method of claim 1 wherein the disk has a thin film overcoat comprising carbon and hydrogen.

8. The method of claim 1 wherein the disk has a thin film overcoat comprising carbon and nitrogen.

9. A method of manufacturing thin film disks comprising the steps of:

depositing at least one thin film on a disk;

reading an identifier from a carrier containing the disk;

recording a first timestamp indicative of a time when thin film deposition was completed, the first timestamp being recorded with the identifier in an automated database;

holding the carrier for a predetermined time;

after the predetermined time has elapsed, applying a lubricant to the disk, the lubricant having a linear perfluoropolyether backbone;

recording a second timestamp with the identifier in an automated database, the second timestamp being indicative of a time when the lubricant was applied; and reading the identifier and rejecting the disk if more than a selected time period has elapsed alter the lubricant was applied or else performing an abrasive polishing of the disk.

10. The method of claim 9 wherein the holding step further comprises placing the disk at a designated location and using a timing aid to alert an operator when the disk is ready for lubrication.

11. The method of claim 9 wherein the linear perfluoropolyether backbone has functional groups as end caps.

12. The method of claim 9 wherein the lubricant has an end group comprising $CH_2OCH_2CH(OH)CH_2OH$.

13. The method of claim 9 wherein the disk has a thin film overcoat of diamond-like carbon.

14. The method of claim 9 wherein the disk has a thin film overcoat comprising carbon and hydrogen.

15. The method of claim 9 wherein the disk has a thin film overcoat comprising carbon and nitrogen.

* * * * *